L. D. BARNEY.
LAWN SPRINKLING SYSTEM.
APPLICATION FILED JULY 28, 1910.
1,004,726.
Patented Oct. 3, 1911.
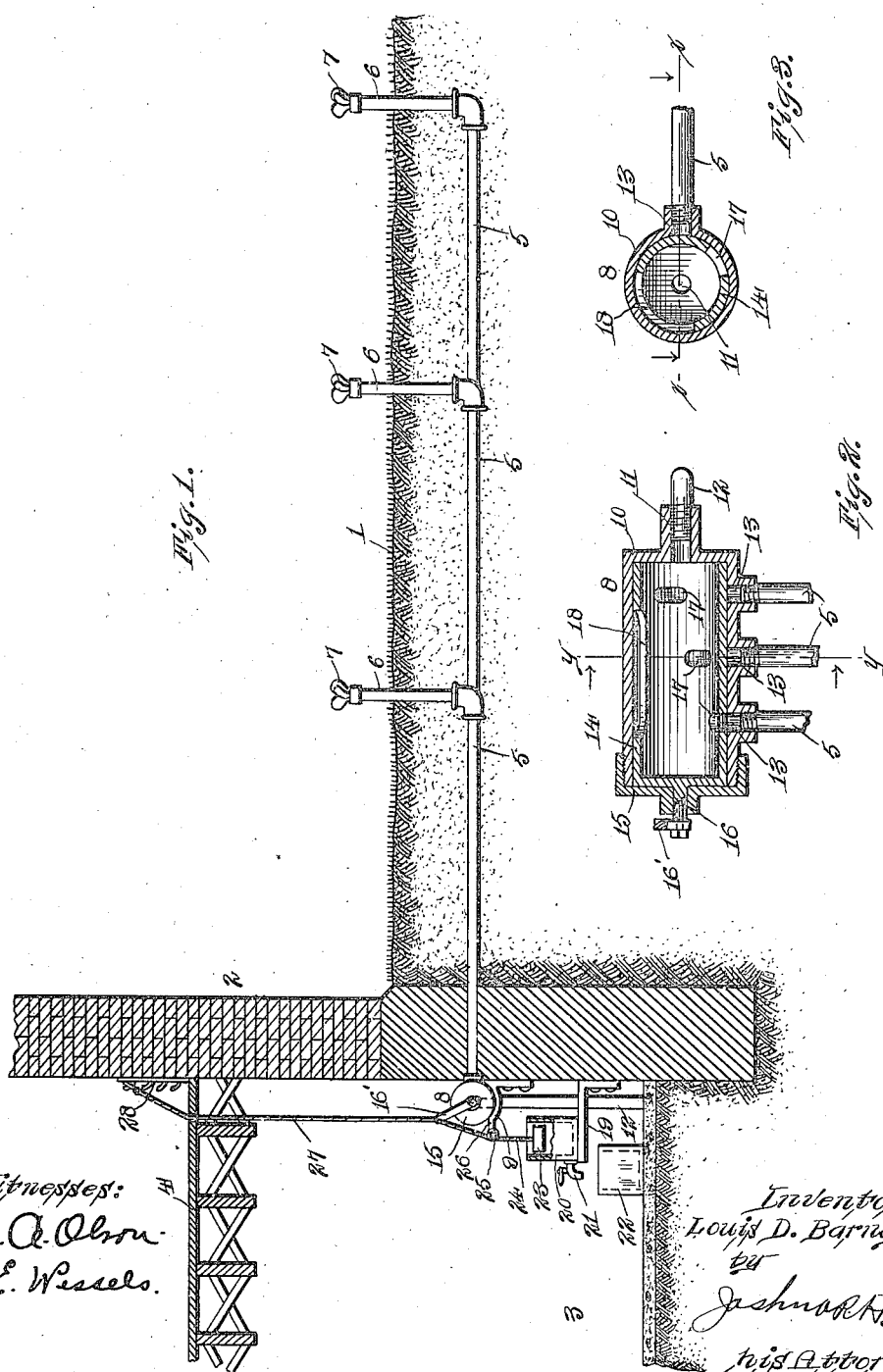

UNITED STATES PATENT OFFICE.

LOUIS D. BARNEY, OF CHICAGO, ILLINOIS.

LAWN-SPRINKLING SYSTEM.

1,004,726.

Specification of Letters Patent.

Patented Oct. 3, 1911.

Application filed July 28, 1910. Serial No. 574,369.

*To all whom it may concern:*

Be it known that I, LOUIS D. BARNEY, a citizen of the United States, residing at Chicago, county of Cook, and State of Illinois, have invented certain new and useful Improvements in Lawn-Sprinkling Systems, of which the following is a specification.

My invention relates to lawn sprinkling systems and has for its object the production of a system of this character which will be automatic in its operation, of durable and economical construction, and which will be of great efficiency.
Other objects will appear hereinafter.

With these objects in view my invention consists in a lawn sprinkling system characterized as above mentioned and in certain details of construction and arrangement of parts all as well be hereinafter fully described and more particularly pointed out in the appended claims.

My invention will be more readily understood by reference to the accompanying drawing forming a part of this specification, in which, Figure 1 is a sectional view of a lawn and a portion of a house adjacently located to which is applied a sprinkling system embodying the preferred form of my invention, Fig. 2 is an enlarged central longitudinal section of a controlling valve included in the system, the section being taken on line $x$—$x$ of Fig. 3, and Fig. 3 is a transverse section taken on line $y$—$y$ of Fig. 2.

Referring now to the drawing, 1 designates the lawn to be sprinkled and 2 a dwelling house adjoining the lawn, 3 indicating the basement of said house, the dwelling floor being shown at 4. Extending from said basement is a plurality of water pipes 5 which are buried in the ground beneath the lawn, said pipes being of various lengths so that the same terminate at their outer ends below various points in the lawn. At the outer extremities of the pipes 5 are provided vertically extending exteriorly projecting pipe sections 6, at the upper extremities of which are provided spraying nozzles 7 of any well known type. At their inner extremities the pipes 5 are connected to a valve 8 the function of which is to govern the flow of water to said pipes so as to effect the admission of water thereto successively.
Said valve is arranged within the basement 3, the same being mounted upon a suitable bracket 9. Said valve comprises an outer cylindrical casing 10 open at one end, the opposite end thereof being apertured and nippled as at 11 for the connection of the water supply pipe 12 thereto, water under pressure being supplied through the latter. In the lateral wall portion of said casing is provided a plurality of spaced discharge openings 13, the outer ends of said openings being provided with nipples for the connection of the pipes 5 thereto. Snugly fitted within the casing 10 is a rotatable hollow cylinder 14, the end thereof registering with the opening 11 in the casing 10 being open for the admission of water thereto. Said member 14 is held in position in the casing 10 by means of a head 15 threaded upon the open end of the latter. Said head is centrally apertured for the passage of a stem 16 projecting centrally from the adjacent head of the member 14, an arm 16' rigidly attached to said stem affording means for ready rotation of the member 14. In the lateral wall of the latter is provided a plurality of circumferentially elongated slots 17 so positioned therein that when the member 14 is rotated said slots will be adapted to register with the openings 13 in the casing 10. Said slots are, as seen, radially spaced in the member 14 so that, when the latter is rotated as above mentioned, the former will be successively brought to register with the openings 13, the arrangement being such that, when any one of said slots is in registration with its discharge opening 13, the remainder of the openings 13 will be closed by the lateral wall of the member 14. The side of the latter opposite the slots 17 is cut away as at 18 so that with water under pressure in the valve, as when the device is in operation, pressure will be brought to bear by the water more strongly upon the slotted side of said member to force the same into close engagement with the adjacent wall of the casing 10 and thereby prevent leakage between said walls.

Arranged upon a bracket 19 positioned below the valve 8 is a water pan 20. A cock 21 controls a discharge opening at the lower end of said pan, said cock permitting discharge from the pan 20 to a recepetacle 22 arranged below the same. Vertically movable in the pan 20 is a float 23 which is connected to the free end of the arm 16' by a cord 24, the latter passing over a roller 25 carried in a projection 26 formed integral with the bracket 9. A cord 27 secured at its lower end to the free end of the arm 16' extends upwardly therefrom through the floor 4 for connection with a fingered bracket 28 whereby said cord may be supported at different elevations.

The operation of the system is as follows: The pan 20 is first filled with water to a level at which the water will buoy up the float 23 to a height at which the first of the slots 17 will just be in registration with the discharge opening 13 co-acting therewith, such position thereof being clearly shown in Fig. 2. Water under pressure is then admitted through the pipe 12 to the valve 8 and the water in the pan 20 is permitted to drain slowly through the cock 21 to the receptacle 22, the upper end of the cord 27 being, in this operation, supported at its lowermost position so as to permit of free downward movement of the arm 16'. With this arrangement it will be seen that as the pan 20 drains, effecting the gradual lowering of the surface or level of the water therein and hence of the position of the float therein, the arm 16' will be rocked downwardly. Such rocking of the arm 16' obviously effects the bringing of the slots 17 successively into registration with the various discharge openings 13. Thus water will be successively admitted to and discharged from the pipes 5, effecting the sprinkling of the entire lawn in sections. The arrangement is such that, when said float has reached its lower terminal of movement in the pan 20, the member 14 will be in a position in which communication of the valve 8 with the pipes 5 will be shut off entirely. Thus a lawn may be thoroughly sprinkled, the change in the local application of water to the various sections of the lawn being automatically effected.

The cord 27 is provided for employment in the event of the float mechanism becoming disabled, or where it is desired perhaps to sprinkle certain sections of the lawn more thoroughly than others, since with this arrangement the member 14 may be held in one position any length of time, to change the position thereof it requiring only to engage said cord with a lower or higher hook, as the case may be, in the rack 28.

While I have shown what I deem to be the preferable form of my sprinkling system I do not wish to be limited thereto as there might be various changes made in the details of construction and arrangement of parts described without departing from the spirit of the invention comprehended within the scope of the appended claims.

Having described my invention what I claim as new and desire to secure by Letters Patent is:

1. In a lawn sprinkling system, the combination with a lawn, an adjoining dwelling house, and a source of water supply, of a plurality of pipes buried in said lawn the outer extremities thereof terminating so as to adapt the same to spray water over various sections of said lawn, a valve arranged in said house, the same communicating with said source of water supply and controlling the flow of water to said pipes, said valve being adapted to successively establish communication between said pipes and said source of water supply, and automatic and manually operable means for operating said valve, substantially as described.

2. In a lawn sprinkling system, the combination with a lawn, an adjoining dwelling house, and a source of water supply, of a plurality of pipes buried in said lawn the outer extremities thereof terminating so as to adapt the same to spray water over various sections of said lawn, a valve arranged in said house the same communicating with said source of water supply and controlling the flow of water to said pipes, said valve being adapted to successively establish communication between said pipes and said source of water supply, and gravity governed means and manually operable means for operating said valve, substantially as described.

In testimony whereof I have signed my name to this specification in the presence of two subscribing witnesses.

LOUIS D. BARNEY.

Witnesses:
W. C. SMITH,
JOSHUA R. H. POTTS.